May 15, 1928.

J. G. SWAIN 1,669,498

WHEEL

Filed Dec. 13, 1924

INVENTOR.
JOSEPH G. SWAIN.
BY
ATTORNEY.

May 15, 1928.  
J. G. SWAIN  
1,669,498  
WHEEL  
Filed Dec. 13, 1924  
3 Sheets-Sheet 3
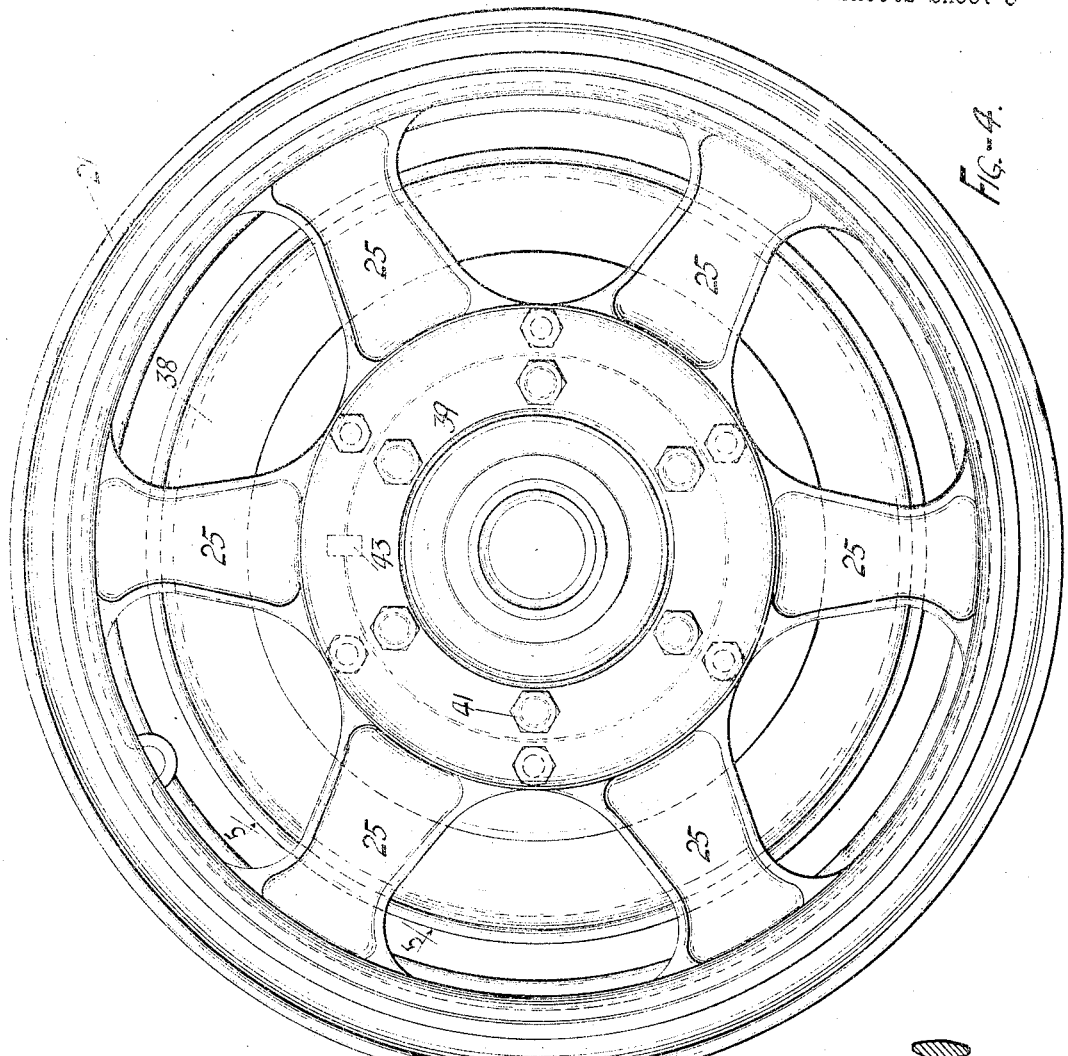
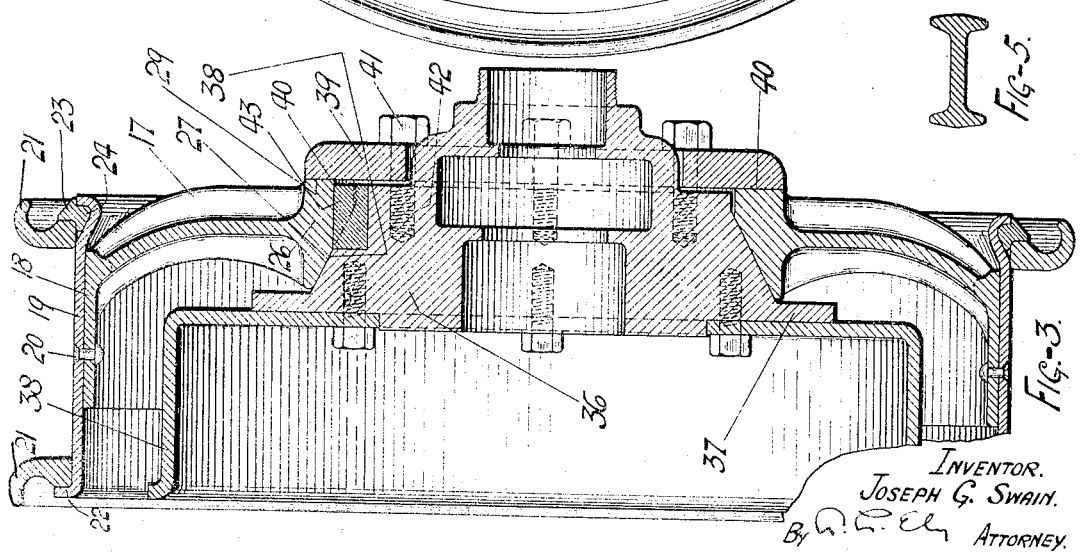
INVENTOR.
JOSEPH G. SWAIN.
ATTORNEY.

Patented May 15, 1928.

1,669,498

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

WHEEL.

Application filed December 13, 1924. Serial No, 755,597.

This invention relates to wheel equipment especially for use on trucks or busses and particularly to demountable wheel constructions in which the wheels are interchangeable in either front or rear positions, and two of which are adapted to be movably mounted together on the rear wheel to provide a dual wheel.

The purpose of the invention, in general, is to provide simple and inexpensive but highly efficient constructions whereby a truck or bus having single front wheels and dual rear wheels can be equipped with wheels which are quickly demountable for replacement purposes, and which are interchangeable on front or rear hubs.

One object of the invention is to provide a wheel adapted to be quickly mounted or demounted from the hub, the wheel being received on a key on the hub and being wedged into position thereon by a clamping ring or its equivalents, the wheels being adapted to be mounted together on a suitable hub to provide a dual wheel.

Another object of the invention is to provide a hub construction adapted for the reception of two of the above described wheels which are adapted to be secured together thereon over a key by a wedging clamp ring or the like.

The foregoing and other more particular objects will become apparent when the following description is read in connection with the accompanying drawings, it being understood that the invention is not limited to the specific forms which are shown and described for purposes of illustration only.

Of the accompanying drawings:

Figure 3 is a diametral section through a single wheel construction embodying the invention;

Figure 4 is an outer side elevation thereof; and

Figure 5 is a detail section on line 5—5 of Figure 4.

Figure 1:
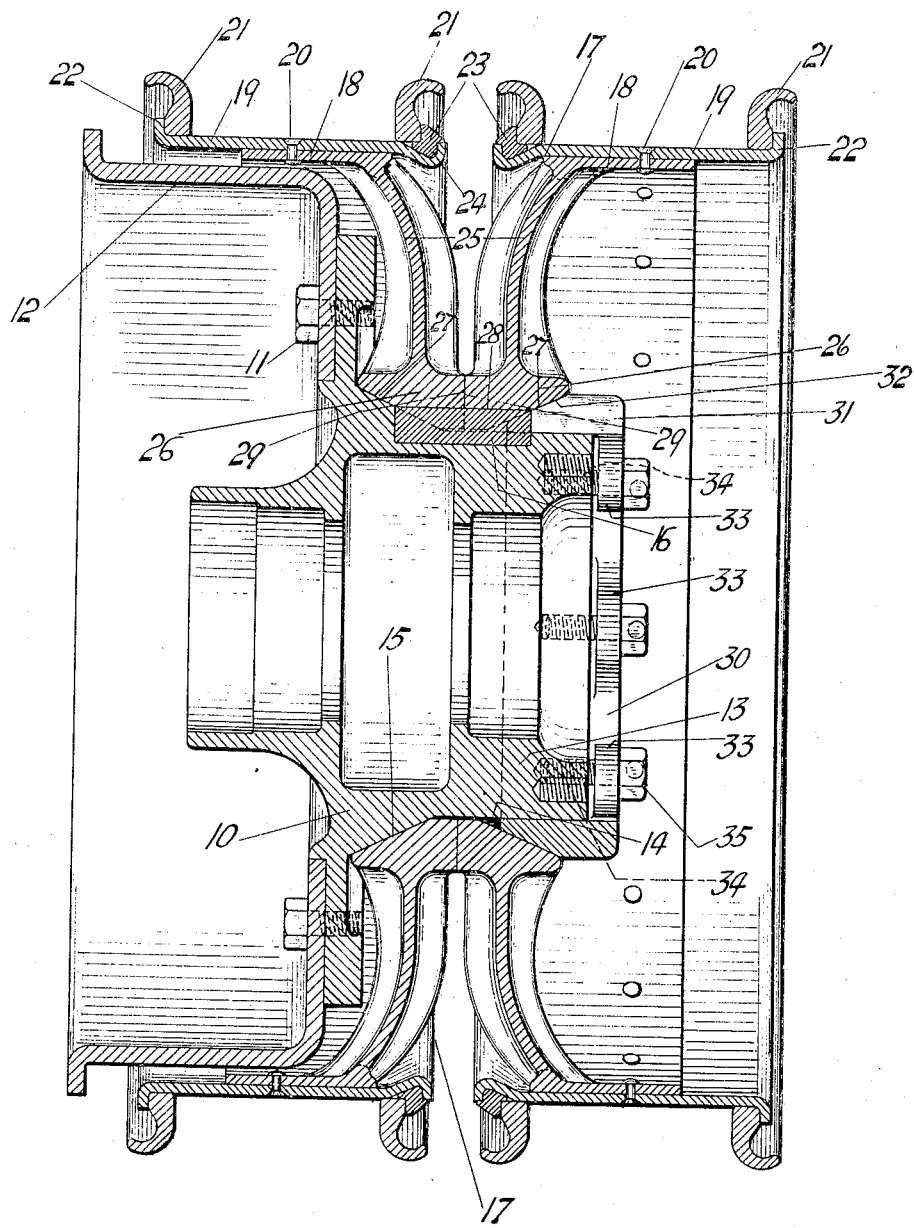
Figure 1 represents a diametral section through a dual wheel construction embodying the invention.
Figure 2:
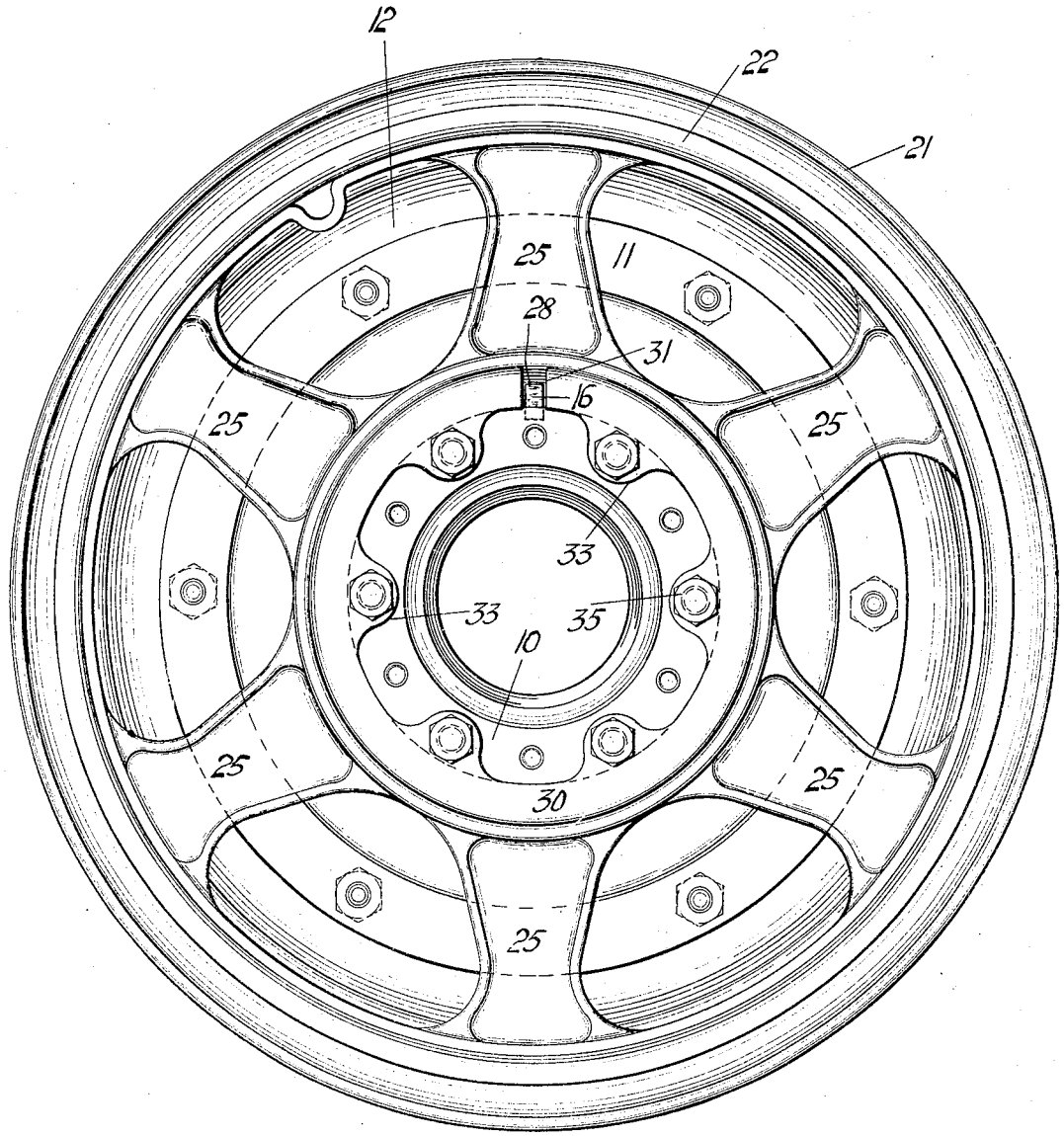
Figure 2 is an outer side elevation thereof.

The dual wheel construction will be first described. The number 10 represents a rear hub casting which on its inner end is formed in the conventional manner for mounting on the vehicle, it having a flange 11 thereon on which is secured the brake drum 12. The casting 10 has formed thereon for the reception of the improved wheel construction an outwardly extending sleeve 13 formed with a right cylindrical surface 14 inwardly from its outer end and a conical surface 15 continuous with the surface 14 and inclined inwardly therefrom to form a wedging shoulder or abutment for the wheels as will later appear. A key 16 is secured in the sleeve 13, one end of which is embedded in the shoulder 15 as shown in Figure 1.

The wheels, indicated at 17, 17 may be cast spoke wheels (as shown) or disk wheels and each is provided with a felly 18 which may be adapted to have a demountable rim secured thereon in the well-known manner but which preferably has secured thereon a rim 19 secured as by countersunk rivets 20, 20, the rim 19 being of the type provided with removable flanges 21, the inner one retained thereon by a vertical flange 22 and the outer one by a removable split locking ring 23 seated in a trough 24 in the rim. Each wheel 17 is formed with curved or concave spoke or disc portions 25 whereby when a pair of wheels 17 are reversely mounted together, as shown in Figure 1, fellies 18 will be so spaced as to support rims 19 with sufficient clearance to properly carry two tires out of contact with each other on the wheels. By "concave" it is meant that the hub engaging portion is not in a plane with the felly.

Each wheel 17 is formed with a collar 26 slidable onto sleeve 13 and formed with an inner conical or wedging surface 27. In the dual wheel construction, the surface 27 on the inner wheel 17 is adapted to abut the shoulder 15 and to wedge thereon. Each collar 26 is formed with a keyway 28 by which wheels 17 are secured against rotation on the hub. The collar 26 is also formed with a vertical edge 29 on one side thereof, which in the use of the wheels for a dual construction are arranged to abut each other.

For securing a pair of wheels 17 on the rear hubs, a split clamping ring 30 may be employed, the ring 30 having an inner circumference such that it may slide onto the sleeve 13, the split 31 being arranged to embrace the outer end of key 16. The ring 30 is formed with a wedging surface 32 adapted to engage the surface 27 on the outer wheel 17. For urging the clamping ring 30 inwardly on the sleeve to securely wedge the wheels 17 in place thereon, the ring is formed with inwardly extending apertured lugs 33, 33 and the sleeve 13 with threaded sockets 34, 34 in its outer edge with which the apertured lugs are adapted to align whereby cap screws 35, 35 may be inserted through the lugs into the sockets and utilized to draw the ring 30 inwardly on the sleeve 13 to securely clamp the wheels 17 together onto the hub. Key 16 thus secures the wheels 17 and the clamp 30 for rotation with the hub 10 and clamp 30 secures them against sliding off the hub.

In the front wheel construction, wheel 17 is adapted to be secured on a hub 36 which is partly of conventional construction, having a flange 37 thereon onto which is secured brake drum 38. The outer side of hub 36 is formed with a conical shoulder 38ª against which the surface 27 of wheel 17 is adapted to be urged by a continuous clamping ring 39 formed with a face 40 adapted to engage the edge 29 on collar 26 of the wheel 17. To draw the clamping ring 39 into engagement with edge 29 on collar 27, cap screws 41, 41 are inserted through apertures in the ring and into threaded sockets 42, 42 in the hub 36. For keying the wheel onto hub 36, a key 43 is embedded in shoulder 38ª so as to extend outwardly therefrom and so as to enter keyway 28 in the wheel.

As will be apparent from the foregoing, the wheels are readily interchangeable either for single or dual mounting. This is particularly desirable in connection with the use of spare wheels since the spare will be capable of use in any one of six places on the hubs of the vehicle, thus rendering the carrying of two kinds of spare wheels unnecessary. The concave formation of the wheels is such that when dually mounted the rims will be properly spaced apart and when singly mounted the rim will overlie the brake drum to form a compact wheel structure.

Modifications of the invention may be resorted to without departing from the spirit thereof or the scope of the appended claims.

What I claim is:

1. A wheel construction comprising a hub provided with an outwardly extending, generally cylindrical sleeve, a conical shoulder on the inner end of said sleeve, a key embedded in the sleeve partly in the shoulder, a pair of wheels mounted on the sleeve, said wheels each having a conical face and a vertical face thereon, the conical face of the inner wheel being in engagement with said shoulder, the vertical faces of the wheels being in face to face contact, and the conical face of the outer wheel being disposed outwardly of the hub, said wheels having keyways therein whereby they are adapted to slide over said key to be non-rotatably secured on said hub, and means for securing the wheels against movement laterally on the hub, said means including a transversely split clamping ring slidable on the hub, the split adapted to clear the key, the ring being formed with a wedge surface adapted to engage the conical face of the outer wheel, apertures in the clamping ring, threaded sockets aligned with said apertures in the hub, and cap-screws inserted through the apertures and screw-threadedly received in the sockets.

2. A wheel construction comprising a hub provided with an outwardly extending, generally cylindrical sleeve, a conical shoulder on the inner end of said sleeve, a key embedded in the sleeve partly in the shoulder, a pair of wheels mounted on the sleeve, said wheels each having a conical face and a vertical face thereon, the conical face of the inner wheel being in engagement with said shoulder, the vertical faces of the wheels being in face to face contact, and the conical face of the outer wheel being disposed outwardly of the hub, said wheels having keyways therein whereby they are adapted to slide over said key to be non-rotatably secured on said hub, and means for securing the wheels against movement laterally on the hub, said means including a transversely split clamping ring slidable on the hub, the split adapted to clear the key, the ring being formed with a wedge surface adapted to engage the conical face of the outer wheel, and means for urging the clamping ring inwardly of the hub.

3. A wheel construction comprising a hub provided with an outwardly extending, generally cylindrical sleeve, a conical shoulder on the inner end of said sleeve, a key embedded in the sleeve partly in the shoulder, a pair of wheels mounted on the sleeve, said wheels each having a conical face and a vertical face thereon, the conical face of the inner wheel being in engagement with said shoulder, the vertical faces of the wheels being in face to face contact, and the conical face of the outer wheel being disposed outwardly of the hub, said wheels having keyways therein whereby they are adapted to slide over said key to be non-rotatably secured on said hub, and wedging means for securing the wheels against movement laterally on the hub, said means being adapted to cooperate with the conical face on the outer wheel.

4. A dual wheel construction comprising a hub, a conical abutment on the inner end of the hub, a pair of wheels slidable on the hub, the inner side of one wheel being adapted to cooperate with the abutment, the outer side of said wheel being adapted to cooperate with the other wheel, and conical means arranged to cooperate with the outer side of the other wheel to urge the wheels together and the first wheel against the abutment.

5. A dual wheel construction comprising a hub, a conical abutment on the inner end of the hub, a pair of wheels slidable on the hub, the inner side of one wheel being adapted to cooperate with the abutment, the outer side of said wheel being adapted to cooperate with the other wheel, means for securing the wheels against rotation on the hub, and means arranged to cooperate with the outer side of the other wheel to urge the wheels together and the first wheel against the abutment.

JOSEPH G. SWAIN.